Feb. 5, 1946. W. HOWALD 2,394,179
PISTON FOR INTERNAL-COMBUSTION ENGINES
Filed March 31, 1944 2 Sheets-Sheet 1
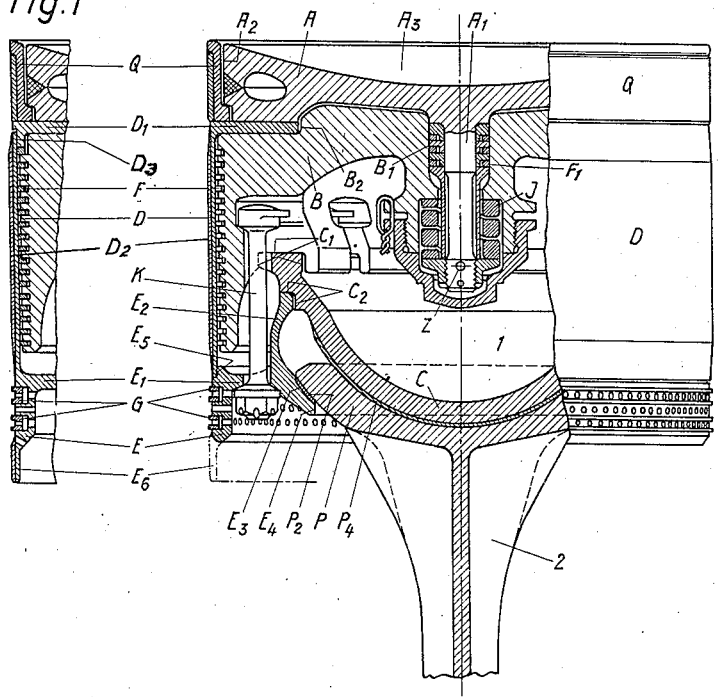
Fig. 1
Fig. 1'
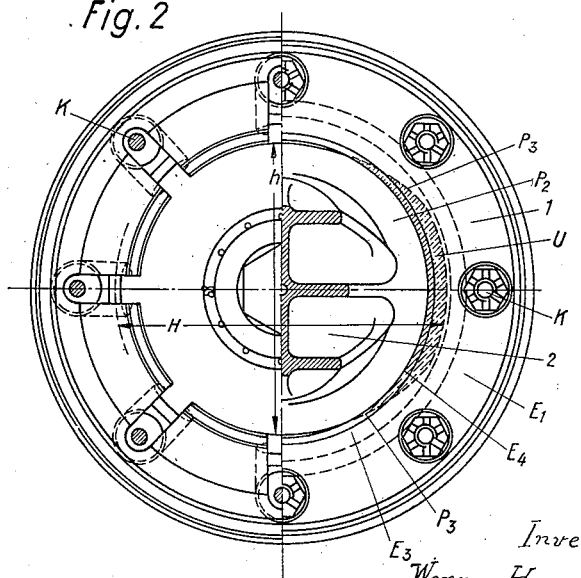
Fig. 2
Inventor:
Werner Howald
By Singer, Ehlert, Stern & Carlberg
Att'ys Inventor:
Werner Howald
By Singer, Ehlert, Stern & Carlberg
Attys.

Patented Feb. 5, 1946

2,394,179

UNITED STATES PATENT OFFICE 2,394,179

PISTON FOR INTERNAL-COMBUSTION ENGINES

Werner Howald, Zurich, Switzerland

Application March 31, 1944, Serial No. 528,832
In Germany April 12, 1943

5 Claims. (Cl. 309—14)

This invention refers to improvements in or relating to pistons for internal combustion engines, especially for two-stroke internal combustion engines.

According to the present invention, the piston is attached to a connecting rod having a head provided with two concentric spherical bearing surfaces which are engaged respectively by two axially spaced concentric spherical bearing faces on the piston rod. The spherical bearing face of the piston having the larger diameter is arranged on an integral ring member attached to the piston and the head on the connecting rod is provided with a non-circular circumference having two different diameters measured at right angles to each other. One of the last named diameters is smaller and the other is larger than the average diameter of the opening in said ring member, whereby the connecting rod is adapted to be connected to the piston by introducing the head of the connecting rod into the opening of the ring member in the direction of the larger diameter portion of the head in an inclined position of the connecting rod. Thereafter the connecting rod is swung in alinement with the axis of the piston to bring the spherical bearing surface of the head having the larger diameter of the two in engagement with the spherical bearing face of the ring member.

The nature and characteristic features of the invention will be readily understood from the following description, taken in connection with the accompanying drawings forming part thereof, in which:

Fig. 1 shows a longitudinal section of a piston for Diesel engines.

Fig. 2 shows in its righthand part a bottom view of the piston according to Figure 1 whereby the connecting rod is sectioned, and in its lefthand part a supporting plate also in a bottom view.

Fig. 1' shows a slightly modified form of construction of the piston shown in Figure 1.

Figure 3:
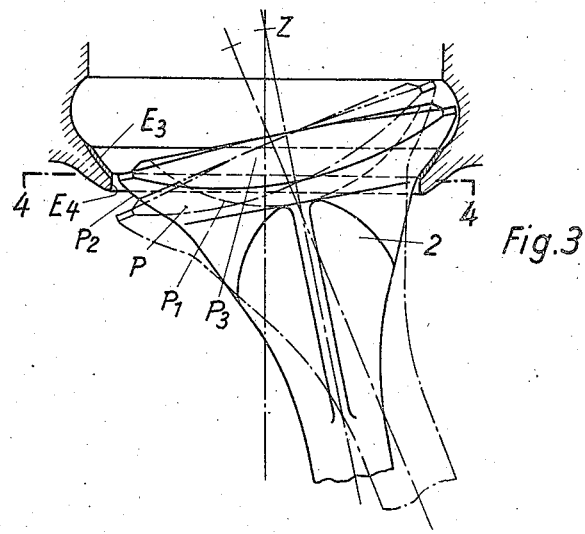

Fig. 3 illustrates the manner in which the head of the connecting rod is inserted into the bearing.

Figure 4:
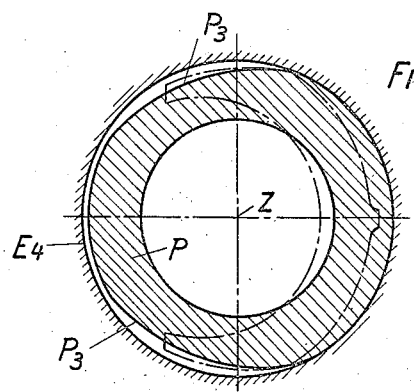

Fig. 4 is a sectional view in the plane indicated by the line 4—4 in Fig. 3.

Figure 5:
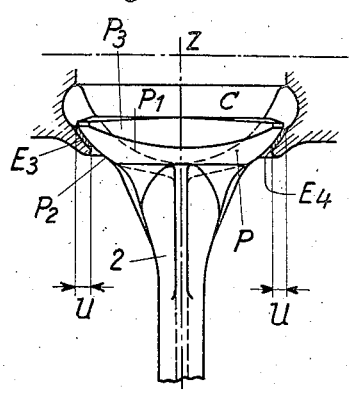
Figure 6:
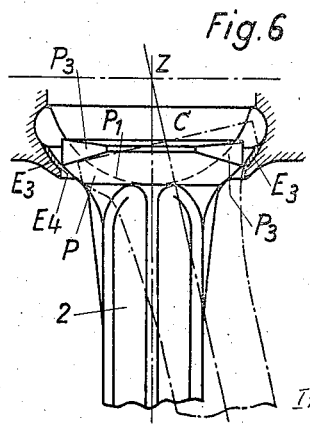

Fig. 5 illustrates the connecting rod in its operative position within the bearing, and Fig. 6 is a view of the bearing and the piston rod taken at 90° from the position shown in Fig 5.

In the embodiment described in the following description and shown in the drawings 1 designates the piston and 2 the connecting rod. Piston 1 slides in a cooled cylinder which has, however, not been represented in the drawings. Piston 1 may also slide in a sleeve valve performing an axial movement combined with an oscillating movement about the cylinder axis, the said sleeve valve controlling the inlet and the outlet ports of the cylinder. In this case the piston moves entirely or partially in the sleeve valve.

The piston shown in the Figures 1 and 2 consists of a top plate A, a supporting plate B adapted to conduct-off heat from the top plate A, a ball-shaped head C, a resilient packing ring Q which is radially movable on its seat, a piston sleeve D, E, piston rings F and $f_1$ conducting-off heat from D, oil rings G and bolts K securing the said parts to the central projection $A_1$.

Top plate A is provided with a central projection $A_1$ projecting into a central bore $B_1$ of the supporting plate B. A spring J acts on the said central projection and presses top plate A on supporting plate B and flange $D_1$ of the piston sleeve. Plate B which supports the top plate A and conducts off heat from the same is supported and centered by the ball-shaped head C at $C_1$. The lower part E of the piston body is centered and supported by means of a radial projection $E_1$ and supporting arm $E_2$ in the bearing surface $C_2$ of head C. The radial projection $E_1$ of the piston body E is also provided with a ball shaped bearing $E_3$ for the connecting rod, the surfaces $E_3$ and C being concentric. The cylindrical surface $E_5$ of the piston body E centers the upper piston sleeve D. The latter is furthermore centered by its radially projecting flange $D_1$ which is guided by the cylindrical surface $B_2$ of the supporting plate B. Flange $D_1$ is clamped between the plates A and B by spring J. The cavity $A_3$ of top plate A forms the major part of the combustion chamber. Top plate A is furthermore provided with a recess $A_2$ containing the L-shaped packing ring Q which is movable in radial direction.

It may be gathered from Figure 1 that the supporting surface $E_3$ and the projections $E_1$ and $E_2$ together with that part E of the piston body containing the rings G forms an extremely rigid supporting web in the piston.

In the upper part of the piston the flange $D_1$ of the piston sleeve forms an equally rigid support web. The same is maintained in its place by supporting plate B. Plate B is centered by bearing surface $C_1$ without any play and it centers again at $B_2$ the upper supporting flange $D_1$.

As shown in Figure 1 the sleeve D of which the medium part is of cylindrical shape is self-contained, that is the same is not supported at any point from flange D₁ to the lower flange E₁ and it is centered on the cylindrical part E₅ of the latter with slight drive fit. Preferably the lower flange E₁ is provided with a lowermost, unsupported projection E₆ which is shown in Figure 1 in dash-and-dot lines. The piston ring Q sits on flange D₁ and is movable in axial direction. Ring Q is preferably resilient and formed as a part of flange D₁. The running surfaces of the piston parts D and E₆, which are resilient in radial direction are, beginning with their ends where they rest on the rigid supporting flanges towards their medium part of a conical shape in such a way, that sleeve D contacts with the working cylinder only along its middle part. Similarly part E₆ bears against the working cylinder or against the sleeve valve only with its outward end. As is shown in Figure 1 these parts of the piston which take up the guiding forces of the piston may be given any desired wall thickness. Of course the resiliency of the sleeve D varies according to the thickness of its walls. In the modification represented in Figure 1' sleeve D, which is resilient in radial direction, forms one piece with part E, it rests on the radially projecting flange D, and is centered on the same by means of the cylindrical drive fit D₃. In both modifications it has, however, been considered that in spite of the mentioned resiliency in radial direction the whole length of the central part of the sleeve D tightly contacts with the rigid part of the piston body and the supporting plate B so as to allow an efficient conducting-off of heat. On the other hand rings F are arranged in radial grooves of supporting plate B. These rings have very little play in axial direction and their play in radial direction is limited in such a way that they resiliently bear against sleeve D and follow every radial movement of the same. When supporting plate B is made of an aluminium- or electron-alloy, and when the slotted rings F are dimensioned so that their ends on both sides of the slots contact at maximum working temperature, and when at the same time the rings bear radially against sleeve D, an efficient flow of heat from the supporting plate B to the sleeve E is guaranteed. Preferably the rings F are made of a light metal alloy.

As is shown in the Figures 1 and 1' a thin layer D₂ of a bearing metal, for instance a 10% tin bronze alloy is applied to the sleeve D so as to ensure perfect runing qualities of the piston in the cylinder or in the sleeve valve. The said bearing metal is applied to the sleeve D in molten condition so as to obtain a metallic fixation on the sleeve. Instead of providing the said layer of bearing metal the entire sleeve D may be made of cast iron with good running qualities. The coefficient of heat elongation of the material used to this end is preferably smaller than that of the material used for the cylinder or for the sleeve valve. When a sleeve D of such material is mounted in a cylinder the temperature of the sleeve D rises when the engine is working until the radial play of the sleeve D assumes a value of approximately .03 to .01 mm. In this case the heat is efficiently carried off from the top plate B to the rings F, from the latter to the entire circumference of the sleeve D and ultimately to the cooled cylinder wall or to the sleeve valve. The mentioned low radial play of sleeve D is automatically attained with any thermal load on the piston. When the said thermal load is small the heat is stored up in the sleeve D until its temperature has risen to such an extent that its radial play sinks to the mentioned low value, eventually to zero mm. whereupon the heat is led off to the cylinder wall. Even when under full load the sleeve D would likely extend some .01 mm. more than it is able to do in the cylinder, there occurs no corrosion nor any abnormal wear, as this deformation lies within the elastic deformation of the sleeve according to this invention and does not produce too high pressures on the cylinder wall. The described sleeve D which is resilient in radial direction assumes exactly the shape of the cylinder wall or of the sleeve valve if the latter is deformed by heat. As a tight fitting of the sleeve D according to this invention may be readily obtained with any thermal load on the piston the same may take up much higher loads than a usual piston, for instance than a light metal piston and the number of piston rings sliding on the cylinder wall or on the sleeve valve may be considerably reduced, or they may entirely be omitted.

When the piston is working the radial pressure is a maximum where the conical parts and the cylindrical part of the piston body meet and it is a minimum in the middle part of sleeve D and at the free end of E₆. At the same parts of the piston the wear is a maximum and a minimum respectively. After very few hours of running the piston shows an efficient lubricating film and from this moment wear is reduced to a minimum, especially if such a piston is mounted into a cylinder provided with a sleeve valve performing an oscillating movement about the piston axis, because in this case the piston driven by the sleeve valve rotates slowly about its own axis, whereby wear is distributed on the entire piston circumference.

It is also advantageous if the diameters of the sleeve D and of the running surfaces of the cylinder or of the sleeve valve are chosen in such a way that at working temperature they run the one within the other with playfree fitting. This feature is described and protected by my United States Patents 2,090,889 and 2,199,314.

As may be gathered from Figure 1 the described construction of the piston allows a very advantageous form of the top plate A. The same is provided with an annular cavity which is very rigid with respect to torsion and bending stresses. The central part of the top plate has a depression which again forms the combustion chamber. Preferably the top plate A rests only with its parts which lie in the neighbourhood of the said collar on the support plate and the flange D₁ respectively. The width of this bearing surface is such, that the temperature of the top plate on its top side adjoining the combustion chamber is 500 to 700° C. If the temperature of the said top side of the top plate rises to too high a temperature, sodium is filled into the hollow space in the top plate whereby an increased quantity of heat is carried off to the cooled side of the top plate. Top plate A is pressed on the flange D₁ and the support plate B by the combustion pressure whereby an efficient carrying-off of heat and a tight packing is ensured. In the central part of the piston there is a little space between top plate A and supporting plate B so that plate A rests on plate B only after having performed a certain elastic deflection. The said space may be dimensioned in such a way that top plate A rests on plate B only when maximum elastic deflection occurs. This construction protects the central part of the top plate from too high stresses due to thermal and mechanical stresses. The rings $f_1$ ensure a perfect conducting-off of the heat from the central part of the top plate to the supporting plate B in spite of the constant movement of the central part of the top plate with respect to the supporting plate under the influence of the pulsating forces. As the rings $f_1$ conduct-off the heat from the top plate to the supporting plate on the shortest possible way spring J is protected from being heated to too high a temperature. Manufacturing, mounting and the choice of the material for the rings $f_1$ is done in the same way as described with respect to the rings F. As the rings $f_1$ constantly move in the central bore $B_1$ of the supporting plate B they should further be made of a material with good running qualities on the material used for the said supporting plate. The rings $f_1$ may or may not be slotted. If the hollow collar of the top plate should tend to rotate, one of the bearing surfaces, either the bottom side of the top plate or the top side of the part $D_1$ may be slightly convex. Both bearing surfaces may be slightly convex in the same direction but with different radiuses of curvature. Also in this case part $D_1$ of the piston body is preferably made of hard metal or of gray-iron containing graphite or of a sintered metal containing graphite. The bottom part of the top plate A may be made resistent to wear by welding on its bearing surface hard metal, for instance the alloy known under the designation "Stellit."

As is shown in the Figures 1 and 2 the inner edge $E_4$ of the bearing $E_3$ forms a circle which is concentric to the ball-shaped head C. The seat P for the head C formed in the connecting rod is provided with an inner and an outer concentric spherical surface $P_1$ and $P_2$ which is flattened somewhat on two opposite sides $P_3$ (Fig. 4) in such a way that the outer edge of the seat P has, in analogy to an ellipse a smaller and a greater diameter $h$ and $H$ respectively (Fig. 2). The small $h$ is somewhat smaller than the inner edge $E_4$ of the seat $E_3$ whereas the larger diameter $H$, which is directed in a direction perpendicular or nearly perpendicular to the plane in which the connecting rod 2 is swinging when the engine is working, is considerably greater than the diameter of the inner edge $E_4$ of the bearing $E_3$. Consequently there occurs a certain overlapping U of the bearing $E_3$ and of the outer bearing surface $P_2$ of the seat P which is shown in Figure 2 and Figure 5. It is obvious that the inner edge $E_4$ of the bearing $E_3$ must not necessarily be of an exactly circular shape and it must not necessarily be concentric.

Figures 3 and 4 illustrate the way in which the seat P is inserted into the bearing $E_3$. Figure 3 shows the bearing $E_3$ without the ball-shaped head in longitudinal section. The dash-and-dotted lines represent the seat P as it is inserted in an inclined position with respect to the opening $E_4$ of the bearing $E_3$ in the direction of its greater diameter $H$ into the bearing $E_3$. After insertion into the bearing $E_3$ it is turned into the position represented in drawn-out lines whereby the centre Z of the bearing $E_3$ coincides with the centre of the outer seat $P_2$ of the seat P. Figure 4 shows a section on line 4—4 of Fig. 3 through bearing and seat in the mentioned position. The dash-and-dotted line in Figure 4 shows the same section of the ball-shaped seat in the position represented in dash-and-dotted lines in Figure 3.

The working position of the connecting rod shown in Figure 5 is obtained by swinging the connecting rod represented in drawnout lines in Figure 3 into the axis of the piston about the centre Z. Figure 6 shows the connecting rod with the ball-shaped seat in side elevation whereby the bearing is sectioned. The dash-and-dotted figure shows connecting rod and ball-shaped bearing with maximum deflection.

As shown in the figures the overlapping parts U of the surface $P_2$ of the seat P and of the spherical surface of the bearing $E_3$ as seen in Fig. 5 take up any stresses resulting when the centrifugal force of the piston is greater than the gas pressure in the combustion chamber. These forces act on the bearing not only in the direction of the piston axis but also in a radial direction, in the direction of the greater diameter $H$ of the seat. The closed circularly formed bearing shown in the figures takes easily up the said stresses as it is extremely rigid and it thereby ensures a high security in working.

As shown in the drawings and as described in the foregoing description the piston according to this invention is built up by central symmetrical parts with respect to the piston axis, the said parts being even circular and concentric. In axial direction the said parts are inserted one into the other and thereby guided and centered. The bolts K which keep together the said parts are also central symmetrical with respect to the piston axis. The bearing $E_3$ is formed as a highly stabile and rigid closed circular ring.

The described construction of the piston ensures a central symmetrical flow of heat into and through the piston the cooled cylinder wall and also a maximum surface transmitting heat from the piston to the cylinder wall or to the sleeve valve.

In the upper dead centre there occurs an entirely central symmetrical flow of the stresses through the piston to the connecting rod. This allows very high temperatures and stresses and at the same time very small cross sections, that is a very efficient transmission of stresses.

What I claim is:

1. In combination with a piston and a connecting rod, a head on the connecting rod provided with two concentric spherical bearing surfaces, said piston having two axially spaced concentric spherical bearing faces engaging said two bearing faces on said piston rod head respectively, the spherical bearing face of the piston having the larger diameter being arranged on an integral ring member attached to said piston, said ring member having a circular opening concentric to the axis of the piston, the head on the connecting rod being provided with a non-circular circumference composed of circles having two different diameters measured at a right angle to each other, one of said diameters being smaller and the other being larger than the diameter of the opening in said ring member, whereby the connecting rod is adapted to be connected to the piston by introducing the head of the connecting rod into the opening of the ring member in the direction of the large diameter portion of the head in an inclined position of the connecting rod and thereafter swinging the latter in alinement with the axis of the piston to bring the spherical bearing surface of the head having the larger diameter of the two in engagement with the spherical bearing face of the ring member.

2. In combination with a piston and a connecting rod, a head on the connecting rod provided with two concentric spherical bearing surfaces, said piston having two axially spaced concentric spherical bearing faces engaging said two bearing faces on said piston rod head respectively, the spherical bearing face of the piston having the larger diameter being arranged on an integral ring member attached to said piston, said ring member having a circular opening concentric to the axis of the piston, the head on the connecting rod being provided with a non-circular circumference composed of circles having two different diameters measured at a right angle to each other, one of said diameters being smaller and the other being larger than the diameter of the opening in said ring member, the large diameter of said non-circular circumference being disposed perpendicularly to the plane in which the connecting rod oscillates during normal operation of the piston, whereby the connecting rod is adapted to be connected to the piston by introducing the head of the connecting rod into the opening of the ring member in the direction of the large diameter portion of the head in an inclined position of the connecting rod and thereafter swinging the latter in alinement with the axis of the piston to bring the spherical bearing surface of the head having the larger diameter of the two in engagement with the spherical bearing face of the ring member.

3. A piston, connecting rod and bearing structure for internal combustion engines, comprising a piston body, a ball-shaped bearing head therein, a connecting rod having a head provided with two concentric spherical bearing surfaces, one of which engaging said bearing head, an annular bearing having a spherical surface engaging the other spherical bearing surface of said connecting rod, said annular bearing being formed of a single integral ring provided with a circular opening which is concentric to the axis of the piston, the head of the connecting rod having said two spherical bearing surfaces thereon being provided with an approximately elliptical circumference, the small axis of said elliptical circumference being smaller and its large axis being substantially larger than the diameter of the circular opening of said ring, the large axis of said approximately elliptical head being disposed perpendicularly to the plane in which the connecting rod swings, the head of the connecting rod being adapted to be introduced into the opening of said ring in the direction of the large axis of the said ellipse in an inclined position of the connecting rod, whereupon by swinging the latter in alinement with the piston axis the larger one of the two concentric bearing surfaces is caused to engage the bearing surface of said ring.

4. In combination with a piston and a connecting rod, a head on the connecting rod provided with two concentric spherical bearing surfaces, said piston having two axially spaced concentric spherical bearing faces engaging said two bearing faces on said piston rod head respectively, the spherical bearing face of the piston having the larger diameter being arranged on an integral ring member attached to said piston, said ring member having an opening, the head on the connecting rod being provided with a non-circular circumference having two different diameters measured at a right angle to each other, one of said diameters being smaller and the other being larger than the average diameter of the opening in said ring member, whereby the connecting rod is adapted to be connected to the piston by introducing the head of the connecting rod into the opening of the ring member in the direction of the large diameter portion of the head in an inclined position of the connecting rod and thereafter swinging the latter in alinement with the axis of the piston to bring the spherical bearing surface of the head having the larger diameter of the two in engagement with the spherical bearing face of the ring member.

5. In combination with a piston and a connecting rod, a head on the connecting rod provided with two concentric spherical bearing surfaces, said piston having two axially spaced concentric spherical bearing faces engaging said two bearing faces on said piston rod head respectively, the spherical bearing face of the piston having the larger diameter being arranged on an integral ring member attached to said piston, said ring member having an opening, the head on the connecting rod being provided with a non-circular circumference having two different diameters measured at a right angle to each other, one of said diameters being smaller and the other being larger than the average diameter of the opening in said ring member, the large diameter of said non-circular circumference being disposed perpendicularly to the plane in which the connecting rod oscillates during normal operation of the piston, whereby the connecting rod is adapted to be connected to the piston by introducing the head of the connecting rod into the opening of the ring member in the direction of the large diameter portion of the head in an inclined position of the connecting rod and thereafter swinging the latter in alinement with the axis of the piston to bring the spherical bearing surface of the head having the larger diameter of the two in engagement with the spherical bearing face of the ring member.

WERNER HOWALD.